US012771539B2

(12) United States Patent
Padama et al.

(10) Patent No.: US 12,771,539 B2
(45) Date of Patent: Oct. 20, 2026

(54) SYSTEM, PROGRAM, AND NONVOLATILE STORAGE MEDIUM

(71) Applicant: S.K.Y. QUEST Inc., Tokyo (JP)

(72) Inventors: Everard Mark Padama, Tokyo (JP); Yutaro Sodei, Tokyo (JP)

(73) Assignee: S.K.Y. QUEST INC., Tokyo (JP)

( * ) Notice: Subject to any disclaimer, the term of this patent is extended or adjusted under 35 U.S.C. 154(b) by 124 days.

(21) Appl. No.: 18/879,045

(22) PCT Filed: Sep. 11, 2023

(86) PCT No.: PCT/JP2023/032940
§ 371 (c)(1),
(2) Date: Dec. 26, 2024

(87) PCT Pub. No.: WO2025/057257
PCT Pub. Date: Mar. 20, 2025

(65) Prior Publication Data
US 2026/0246632 A1 Aug. 20, 2026

(51) Int. Cl.

| | |
|---|---|
| ***H04L 9/14*** | (2006.01) |
| ***H04L 67/104*** | (2022.01) |
| *H04L 67/1074* | (2022.01) |

(52) U.S. Cl.
CPC .............. *H04L 9/14* (2013.01); *H04L 67/104* (2013.01); *H04L 67/1078* (2013.01)

(58) Field of Classification Search
CPC . G06F 9/46; H04L 9/14; H04L 67/104; H04L 67/1078
See application file for complete search history.

(56) References Cited

U.S. PATENT DOCUMENTS 10,616,324 B1 * 4/2020 Kaddoura ................. A61F 2/44
10,824,747 B1 * 11/2020 Magerkurth .......... G06F 21/602
(Continued)

FOREIGN PATENT DOCUMENTS

JP 2009-169861 A 7/2009

OTHER PUBLICATIONS

International Search Report and Written Opinion dated Nov. 14, 2023 corresponding to International Patent Application No. PCT/JP2023/032940.
(Continued)

*Primary Examiner* — Shanto Abedin
(74) *Attorney, Agent, or Firm* — SQUIRE PATTON BOGGS (US) LLP

(57) ABSTRACT

A program causes a computer to execute receiving from a server two or more pieces of node identification information selected based on geographical proximity, and receiving three or more pieces of node identification information selected at random. Inspection data is received from each of a total of five or more nodes received from the server. It is then determined whether a majority of the total of five or more nodes store same inspection data and at least one of nodes identified by the two or more pieces of node identification information selected based on geographical proximity is included in the majority of the nodes storing the same inspection data. When the at least one of nodes is included, one node included in the majority of the nodes storing the same inspection data is selected and identified by one of the pieces of node identification information selected based on geographical proximity.

6 Claims, 4 Drawing Sheets

(56) References Cited

U.S. PATENT DOCUMENTS

| | | | | |
|---|---|---|---|---|
| 2003/0115251 | A1* | 6/2003 | Fredrickson | H04L 63/14 709/201 |
| 2020/0021429 | A1* | 1/2020 | Harrington | H04L 9/0825 |
| 2021/0006972 | A1* | 1/2021 | Guim Bernat | H04W 12/041 |
| 2021/0218800 | A1* | 7/2021 | Landman | H04L 9/3239 |
| 2021/0409490 | A1* | 12/2021 | Bag | G06F 9/3012 |
| 2022/0014377 | A1* | 1/2022 | Vasudevan | G06F 21/64 |
| 2023/0156077 | A1* | 5/2023 | Jamil | H04L 67/1008 709/201 |

OTHER PUBLICATIONS

Coinbase, "What is "proof of work" or "proof of stake"?", searched on Aug. 3, 2023, Webpage available at : https://www.coinbase.com/ja/learn/crypto-basics/what-is-proof-of-work-or-proof-of-stake.

* cited by examiner

FIG. 4

| ID | CONTENT | NONCE VALUE | HASH VALUE | ELECTRONIC SIGNATURE |
|---|---|---|---|---|
| USER 1 | CONTENT 1 | 123 | HASH VALUE 1 | ELECTRONIC SIGNATURE 1 |
| USER 2 | CONTENT 2 | 234 | HASH VALUE 2 | ELECTRONIC SIGNATURE 2 |
| USER 3 | CONTENT 3 | 345 | HASH VALUE 3 | ELECTRONIC SIGNATURE 3 |
| USER 4 | CONTENT 4 | 456 | HASH VALUE 4 | ELECTRONIC SIGNATURE 4 |

FIG. 5

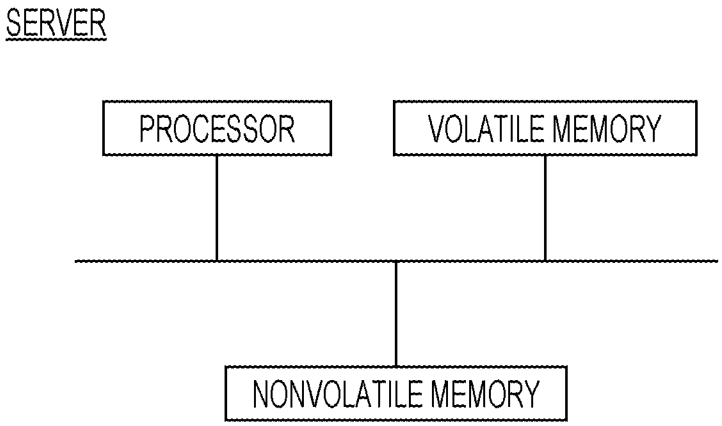

FIG. 6

| NODE IDENTIFICATION INFORMATION |
|---|
| NODE IDENTIFICATION INFORMATION OF NODE 1 |
| NODE IDENTIFICATION INFORMATION OF NODE 2 |
| NODE IDENTIFICATION INFORMATION OF NODE 3 |
| NODE IDENTIFICATION INFORMATION OF NODE 4 |
| NODE IDENTIFICATION INFORMATION OF NODE 5 |
| NODE IDENTIFICATION INFORMATION OF NODE 6 |
| NODE IDENTIFICATION INFORMATION OF NODE 7 |
| NODE IDENTIFICATION INFORMATION OF NODE 8 |

SYSTEM, PROGRAM, AND NONVOLATILE STORAGE MEDIUM

TECHNICAL FIELD

The present invention relates to data management.

BACKGROUND

A decentralized network is known in which individual nodes connected to a peer-to-peer (P2P) network operate based on consensus algorithms such as “proof of work” and “proof of stake” (NPL 1).

CITATION LIST

Non Patent Literature

[NPL 1] Coinbase, “What is “proof of work” or “proof of stake”?”, searched on Aug. 3, 2023 on the Internet <URL: https://www.coinbase.com/ja/learn/crypto-basics/what-is-proof-of-work-or-proof-of-stake>

SUMMARY

Technical Problem

In a decentralized network in which individual nodes operate based on these consensus algorithms, a token is incorporated into data itself managed in the network, and a token is given as an incentive to operate computers in many cases. However, in the network in which individual computers are caused to execute these consensus algorithms, there is a possibility that the network is used for speculation aimed at acquiring a token. In consideration thereof, an object of the present invention is to provide a system, a program and a nonvolatile storage medium which executes a new consensus algorithm that differs from conventional ones.

Solution to Problem

The present invention includes the following embodiments.

A system in which a plurality of terminals, a plurality of nodes that communicate with each other in a peer-to-peer manner, and a server that stores node identification information that identifies the plurality of nodes are connected to each other by a network, wherein each terminal executes, in a case of uploading data to one of the plurality of nodes:

a step of selecting one node;

a step of encrypting a predetermined element included in data to be uploaded; and a step of uploading the data including the encrypted element to the selected one node, each terminal executes, in a case of downloading data from one of the plurality of nodes:

the step of selecting one node;

a step of downloading data from the selected one node; and a step of decrypting a predetermined element included in the downloaded data, each node executes:

the step of selecting one node; and a step of updating data stored in the own node by using data stored in the selected one node, and the step of selecting one node includes:

a step of requesting two or more pieces of node identification information from the server, the two or more pieces of node identification information being selected based on geographical proximity from among a plurality of pieces of node identification information stored in the server;

a step of receiving the two or more pieces of node identification information from the server;

a step of requesting three or more pieces of node identification information from the server, the three or more pieces of node identification information being selected at random from among the plurality of pieces of node identification information stored in the server;

a step of receiving the three or more pieces of node identification information from the server;

a step of requesting inspection data from each of a total of five or more nodes received from the server;

a step of receiving the inspection data from each of the total of five or more nodes; and a step of determining whether a majority of the total of five or more nodes store the same inspection data and at least one of nodes identified by the two or more pieces of node identification information selected based on geographical proximity is included in the majority of the nodes storing the same inspection data, and when the at least one of nodes is included, selecting one node included in the majority of the nodes storing the same inspection data and identified by one of the pieces of node identification information selected based on geographical proximity.

A program for causing a terminal to execute:

in a case of uploading data to a node, a step of selecting one node;

a step of encrypting a predetermined element included in data to be uploaded; and a step of uploading the data including the encrypted predetermined element to the selected one node, and in a case of downloading data from a node, the step of selecting one node;

a step of downloading data from the selected one node; and a step of decrypting a predetermined element included in the downloaded data, wherein the step of selecting one node includes:

a step of requesting two or more pieces of node identification information from the server, the two or more pieces of node identification information being selected based on geographical proximity from among a plurality of pieces of node identification information stored in the server;

a step of receiving the two or more pieces of node identification information from the server;

a step of requesting three or more pieces of node identification information from the server, the three or more pieces of node identification information being selected at random from among the plurality of pieces of node identification information stored in the server;

a step of receiving the three or more pieces of node identification information from the server;

a step of requesting inspection data from each of a total of five or more nodes received from the server;

a step of receiving the inspection data from each of the total of five or more nodes; and a step of determining whether a majority of the total of five or more nodes store the same inspection data and at least one of nodes identified by the two or more pieces of node identification information selected based on geographical proximity is included in the majority of the nodes storing the same inspection data, and when the at least one of nodes is included, selecting one node included in the majority of the nodes storing the same inspection data and identified by one of the pieces of node identification information selected based on geographical proximity.

A program for causing a node to execute:

a step of selecting one node; and a step of updating data stored in the own node by using data stored in the selected one node, wherein the step of selecting one node includes:

a step of requesting two or more pieces of node identification information from the server, the two or more pieces of node identification information being selected based on geographical proximity from among a plurality of pieces of node identification information stored in the server;

a step of receiving the two or more pieces of node identification information from the server;

a step of requesting three or more pieces of node identification information from the server, the three or more pieces of node identification information being selected at random from among the plurality of pieces of node identification information stored in the server;

a step of receiving the three or more pieces of node identification information from the server;

a step of requesting inspection data from each of a total of five or more nodes received from the server;

a step of receiving the inspection data from each of the total of five or more nodes; and a step of determining whether a majority of the total of five or more nodes store the same inspection data and at least one of nodes identified by the two or more pieces of node identification information selected based on geographical proximity is included in the majority of the nodes storing the same inspection data, and when the at least one of nodes is included, selecting one node included in the majority of the nodes storing the same inspection data and identified by one of the pieces of node identification information selected based on geographical proximity.

A program for causing a server to execute:

a step of, in response to receiving from a computer a request for two or more pieces of node identification information selected based on geographical proximity, selecting, based on geographical proximity, two or more pieces of node identification information from among a plurality of pieces of node identification information stored in the server and transmitting the selected two or more pieces of node identification information to the computer; and a step of, in response to receiving from the computer a request for three or more pieces of node identification information selected at random, selecting at random three or more pieces of node identification information from among the plurality of pieces of node identification information stored in the server and transmitting the selected three or more pieces of node identification information to the computer.

A program for causing a computer to execute:

a step of requesting two or more pieces of node identification information from a server, the two or more pieces of node identification information being selected based on geographical proximity from among a plurality of pieces of node identification information stored in the server;

a step of receiving the two or more pieces of node identification information from the server;

a step of requesting three or more pieces of node identification information from the server, the three or more pieces of node identification information being selected at random from among the plurality of pieces of node identification information stored in the server;

a step of receiving the three or more pieces of node identification information from the server;

a step of requesting inspection data from each of a total of five or more nodes received from the server;

a step of receiving the inspection data from each of the total of five or more nodes; and a step of determining whether a majority of the total of five or more nodes store the same inspection data and at least one of nodes identified by the two or more pieces of node identification information selected based on geographical proximity is included in the majority of the nodes storing the same inspection data, and when the at least one of nodes is included, selecting one node included in the majority of the nodes storing the same inspection data and identified by one of the pieces of node identification information selected based on geographical proximity.

Advantageous Effects of Invention

According to an embodiment of the present invention, when a majority of a total of five or more nodes store a same inspection data, in other words, when the number of nodes storing the same inspection data exceeds half of the total of five or more nodes, one node is selected from among the plurality of nodes storing the same inspection data. It is not necessary to use a toke for selecting a node, and it is not necessary to incorporate a token into data.

BRIEF DESCRIPTION OF THE DRAWINGS

FIG. 4 is a schematic diagram illustrating an example of a data structure stored in a node according to the embodiment.

FIG. 5 is a schematic diagram describing a configuration example of a server according to the embodiment.

FIG. 6 is a schematic diagram illustrating an example of a data structure stored in a server according to the embodiment.

DETAILED DESCRIPTION

System According to Embodiment

Figure 1:
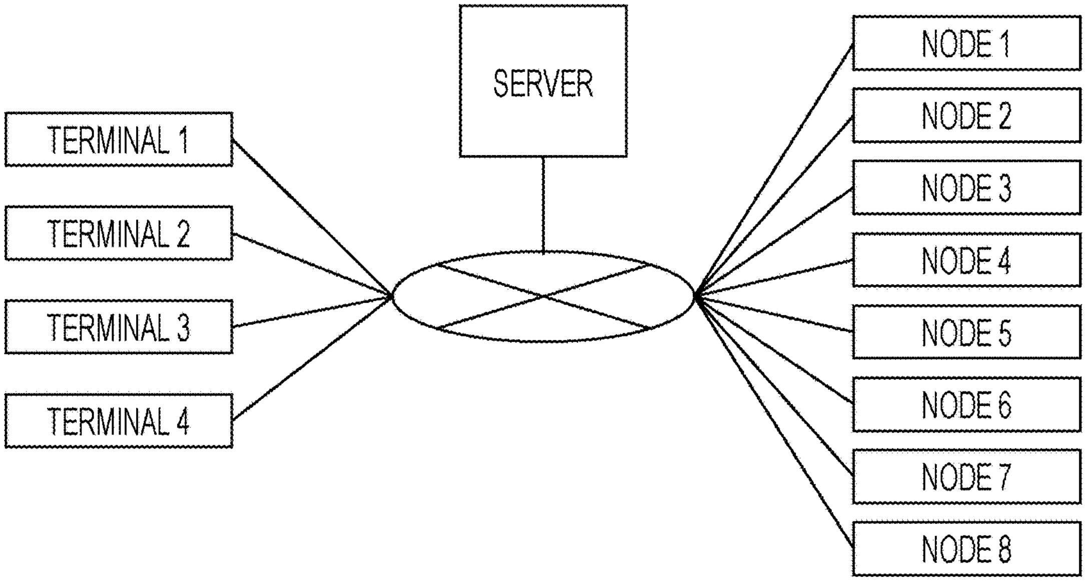
FIG. 1 is a schematic diagram describing a configuration example of a system according to an embodiment.

FIG. 1 is a schematic diagram describing a configuration example of a system according to an embodiment. As shown in FIG. 1, the system according to the embodiment is a system in which a plurality of terminals, a plurality of nodes that store data uploaded by the plurality of terminals, and a server that stores node identification information that identifies the plurality of the nodes are connected by a network. A detailed description will be given below.

(Terminals)

A terminal is a computer operated by a user. Examples of the terminal include a smartphone and a laptop computer.

Figure 2:
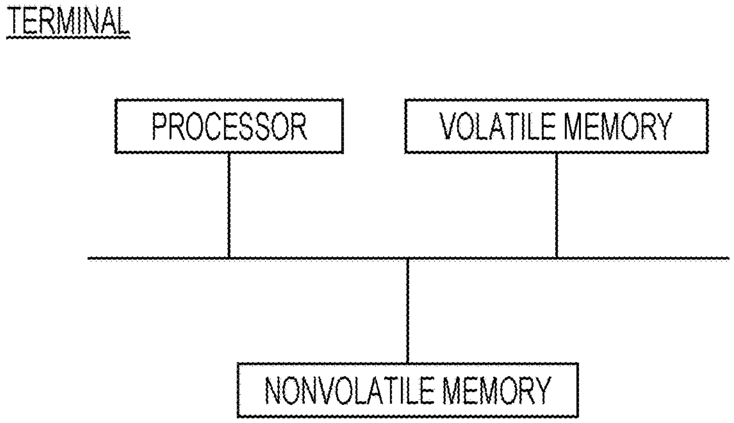
FIG. 2 is a schematic diagram describing a configuration example of a terminal according to the embodiment.

FIG. 2 is a schematic diagram describing a configuration example of a terminal according to the embodiment. As shown in FIG. 2, the terminal includes, for example, a processor, a volatile storage medium, and a nonvolatile storage medium. The terminal operates, for example, when a program recorded on a nonvolatile storage medium is executed by the processor.

(Node S)

The plurality of nodes are a plurality of computers that communicate with each other in a peer-to-peer manner. That is, the nodes communicate with each other in a peer-to-peer manner. The nodes are computers that store data uploaded by a terminal, and may also be referred to as storers. For example, each node updates data stored in the own node by copying data that is stored in another node but not stored in the own node from the other node and adding the copied data to the data of the own node. The plurality of nodes respectively execute such data update in parallel, and data uploaded from a certain terminal to a certain node ends up being stored not only in the certain node but also in other nodes that are connected to the network. In this manner, the data update is respectively executed in parallel in the plurality of nodes, and the plurality of nodes become connected in a mesh-like pattern and data is to be shared among the plurality of nodes. In other words, a peer-to-peer network that shares data is to be constructed.

For example, a description will now be given using an example in which data 1 is stored in node 1, data 1 and 2 are stored in node 2, and data 1 and 3 are stored in node 3. In this case, when node 1 executes data update processing of the own node by using the data of node 2, node 1 copies data 2 from node 2 and adds data 2 to data 1 stored in the own node. After the update, data 1 and 2 are to be stored in node 1. On the other hand, when node 1 executes data update processing of the own node by using data in node 3, node 1 copies data 3 from node 3 and adds data 3 to data 1 stored by the own node. After the update, data 1 and 3 are to be stored in node 1. Node 1 will determine whether to use the data in node 2, the data in node 3, or data in another node by executing a method described later.

Figure 3:
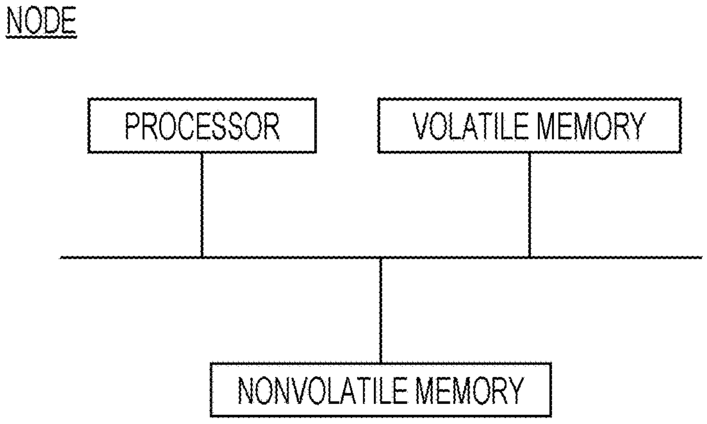
FIG. 3 is a schematic diagram describing a configuration example of a node according to the embodiment.

FIG. 3 is a schematic diagram describing a configuration example of a node according to the embodiment. As shown in FIG. 3, the node includes, for example, a processor, a volatile storage medium, and a nonvolatile storage medium. The node operates, for example, when a program recorded on a nonvolatile storage medium is executed by the processor.

FIG. 4 is a schematic diagram illustrating an example of a data structure stored in a node according to the embodiment. As shown in FIG. 4, the node stores an ID, a content, a nonce value, a hash value, and an electronic signature in association with each other. These pieces of data are stored, for example, on the nonvolatile storage medium of the node.

The ID is information that identifies a user. Examples of the ID include a numeral, a character string, a symbol, and/or a combination of two or more thereof for example. Here, for ease of description, it is assumed that combinations of a character string and a numeral, such as "user 1", "user 2", "user 3", and "user 4", are stored as IDs.

A single content can be constructed by combining a plurality of elements. Examples of elements include a name, a nickname, an address, a text, an image, a voice, and a master key encrypted with a personal public key of the user. Each of these elements can be stored as a single content, for example, in the JSON format.

A predetermined element included in the content need not be encrypted, but is preferably encrypted with, for example, a public key common to the system, a public key for limited publication, or a personal public key in order to enhance security. Which element in the content is to be encrypted or, in other words, a range of the predetermined element can be appropriately set. However, an encrypted master key to be described later is not included in the predetermined element herein.

(Public Key and Private Key Common to System)

Each terminal stores a master key, for example, in a storage area protected by a password. The master key is given to the terminal, for example, upon registration to the system.

Each terminal can generate a public key and private key common to the system by using the master key. Only the terminal according to the embodiment, that is, only the computer that stores the master key and is capable of generating a public key and private key common to the system, can decrypt data encrypted with the public key common to the system by using the private key. The plurality of nodes are not given the master key, and are unable to generate a public key and private key common to the system. Therefore, the plurality of nodes cannot decrypt data encrypted with the public key common to the system.

(Public Key and Private Key for Limited Publication)

A public key and private key for limited publication are generated at the time of data encryption or decryption by using a master key generated by a terminal operated by a user. The master key is encrypted by using a personal public key of a specific user to whom data is published, and is included in the data to be uploaded as one element of the data. For example, when user 1 publishes data only to user 2 and user 3, a master key encrypted with a personal public key of user 2 and a master key encrypted with a personal public key of user 3 are each included in the data to be uploaded from the terminal of user 1 as one element of the data. For example, the master keys are each included in a content of the data to be uploaded from the terminal of user 1 as one element of the content. Only a terminal capable of decrypting the master key by using a personal private key, that is, only a terminal capable of regenerating a private key for limited publication by using the decrypted master key can decrypt data encrypted with the public key for limited publication by using the private key for limited publication. In the example described above, only the terminal of user 2 which can use the personal private key of user 2 and the terminal of user 3 which can use the personal private key of user 3 can decrypt the data.

(Personal Public Key and Private Key)

A personal public key, for example, can be stored in the server according to the present embodiment so that the personal public key can only be accessed by a user registered in the system. When the public key is stored in the server, each terminal can download the public key from the server and use it. A personal private key, for example, can be stored in an area protected by a password in a terminal operated by a user. Data encrypted with the personal public key can be decrypted only by a terminal storing a personal private key paired with the public key. For example, data encrypted with the personal public key of user 1 can only be decrypted with the personal private key of user 1.

The nonce value is, for example, a value that is generated at random by a terminal. The nonce value is, for example, a 12-digit numeral. Note that the number of digits of the nonce value is not limited. In FIG. 4, for ease of description, 3-digit nonce values are illustrated as an example. The nonce value is used to calculate a hash value and an electronic signature.

The hash value is a value calculated by a terminal. The hash value is calculated by using a content and a nonce value as parameters of a hash function. The hash value is used to generate inspection data, which will be described later.

The electronic signature is, for example, generated by encrypting a value calculated by using a predetermined element included in a content and a nonce value with a private key common to the system, a private key for limited publication, or a personal private key. According to the present embodiment, falsification of a content can be readily detected by verifying the electronic signature.

(Server)

The server is a computer that stores node identification information. The node identification information is information that identifies a node on the network, such as an IP address or a uniform resource locator (URL). By using the node identification information, a terminal can access a node, and a node can access another node. An example of the server includes a computer having a server function.

FIG. 5 is a schematic diagram describing a configuration example of a server according to the embodiment. As shown in FIG. 5, the server includes, for example, a processor, a volatile storage medium, and a nonvolatile storage medium. The server operates, for example, when a program recorded on a nonvolatile storage medium is executed by the processor.

FIG. 6 is a schematic diagram illustrating an example of a data structure stored in the server according to the embodiment. As shown in FIG. 6, the server stores a plurality of pieces of node identification information. These pieces of data are stored, for example, on a nonvolatile storage medium of the server.

(Network)

The network is, for example, the Internet.

(Number of Terminals, Number of Nodes)

In the example shown in FIG. 1, four terminals, eight nodes, and one server are connected to the network. However, it is sufficient that the number of terminals be two or more. It is sufficient that the number of nodes be five or more. Preferably, the number of nodes is seven or more.

(Case Where Terminal Uploads Data to Node)

Figure 7:
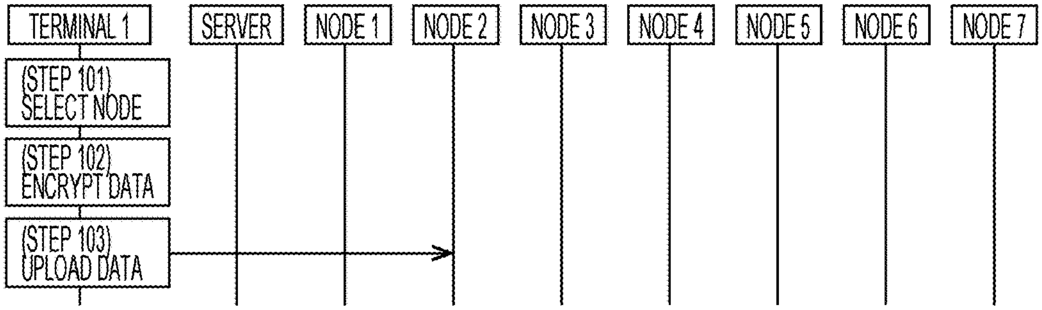
FIG. 7 is a diagram describing an operation example of a terminal according to the embodiment in a case where the terminal uploads data to a node.

FIG. 7 is a diagram describing an operation example of a terminal according to the embodiment in a case where the terminal uploads data to a node. The following steps are executed by the processor of the terminal. A program for causing the processor to execute these steps is recorded on the nonvolatile storage medium of the terminal. Hereinafter, a case where terminal 1 uploads data will be described as an example.

(Step 101)

First, terminal 1 executes a step of selecting one node. Here, as an example, it is assumed that node 2 is selected. This step will be described in detail later.

(Step 102)

Next, terminal 1 encrypts a predetermined element included in the data to be uploaded.

For the encryption, a public key common to the system or a personal public key of the user who operates terminal 1 can be used. Alternatively, a public key for limited publication may be used for the encryption.

In the case of using a public key for limited publication, terminal 1 executes a step of generating a master key by using a personal public key of a specific user and a personal private key of the user who operates terminal 1. For example, when the data is published only to the user who operates terminal 2 and the user who operates terminal 3, terminal 1 executes, for example, a step of adding a personal public key of the user who operates terminal 2, a personal public key of the user who operates terminal 3, and the personal private key of the user who operates terminal 1, and generating a hash value of data obtained through the addition as a master key. For example, when the personal public key of the user who operates terminal 2 is "123", the personal public key of the user who operates terminal 3 is "456", and the personal private key of the user who operates terminal 1 is "789", a hash function, by using "123456789" obtained by adding these keys as a parameter, is executed to calculate a hash value, and the calculated hash value is used as a master key.

Subsequently, terminal 1 executes a step of generating a public key and private key for limited publication by using the generated master key, a step of encrypting the generated master key by using the personal public key of the specific user, and a step of encrypting a predetermined element, other than the encrypted master key, included in the data that includes the encrypted master key as one element, by using the generated public key for limited publication. In the above example, terminal 1 executes a step of generating a public key and private key for limited publication by using the generated master key. Terminal 1 executes a step of encrypting the master key by using the personal public key of the user who operates terminal 2, and encrypting the master key by using the personal public key of the user who operates terminal 3. Subsequently, terminal 1 executes a step of encrypting a predetermined element, other than the master key encrypted by using the personal public key of the user who operates terminal 2 and the master key encrypted by using the personal public key of the user who operates terminal 3, included in the data that includes these encrypted master keys as one element, by using the generated public key for limited publication.

(Step 103)

Next, terminal 1 executes a step of uploading the data including the element encrypted in step 102 to node 2 selected in step 101. The data to be uploaded includes an ID, a content, a nonce value, a hash value, and an electronic signature. It is assumed that the encrypted predetermined element is specifically included in the content.

(Case Where Terminal Downloads Data from Node)

Figure 8:
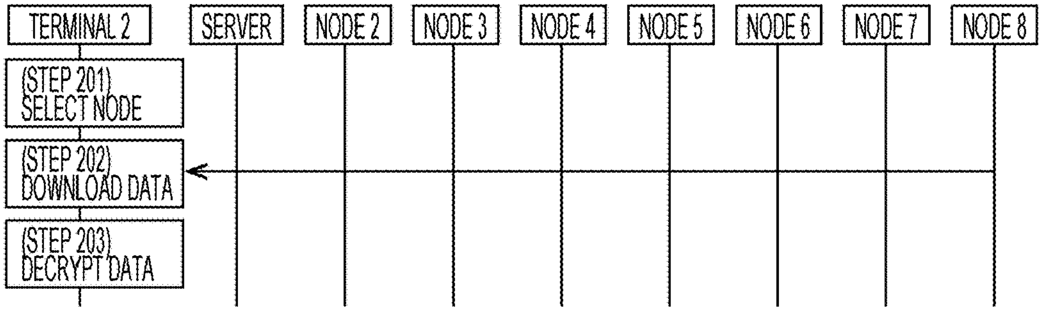
FIG. 8 is a diagram describing an operation example of a terminal according to the embodiment in a case where the terminal downloads data from a node.

FIG. 8 is a diagram describing an operation example of a terminal according to the embodiment in a case where the terminal downloads data from a node. The following steps are executed by the processor of the terminal. A program that causes the processor to execute these steps is recorded on the nonvolatile storage medium of the terminal. Hereinafter, a case where the terminal 2 downloads data will be described as an example.

(Step 201)

First, terminal 2 executes a step of selecting one node. This step is the same step as step 101 described above. Here, as an example, it is assumed that node 8 is selected. This step will be described in detail later.

(Step 202)

Next, terminal 2 executes a step of downloading data from node 8 selected in step 201. For example, not only content but also an ID, a nonce value, a hash value, and an electronic signature are downloaded.

(Step 203)

Next, terminal 2 decrypts a predetermined element included in the downloaded data. For example, terminal 2 decrypts the predetermined element included in the content.

When the predetermined element is encrypted with the public key common to the system or the personal public key of the user who operates terminal 2, terminal 2 decrypts the data with the private key common to the system or the personal private key of the user who operates terminal 2.

When the predetermined element is encrypted with the public key for limited publication, terminal 2 executes a step of decrypting an encrypted master key included in the downloaded data (for example, an encrypted master key included in the content) by using the personal private key of the user who operates terminal 2, and a step of regenerating the public key and private key for limited publication by using the decrypted master key. Subsequently, terminal 2 executes a step of decrypting the predetermined element included in the downloaded data (for example, the predetermined element included in the content other than the encrypted master key) by using the regenerated private key for limited publication. Node 8 stores the master key encrypted with the personal public key of the user who operates terminal 2 and the master key encrypted with the personal public key of the user who operates terminal 3 but does not store a master key encrypted with a personal public key of a user who operates terminal 4. Thus, even when terminal 4 downloads the encrypted master key from node 8 like terminal 2, terminal 4 cannot decrypt the encrypted master key and cannot regenerate the public key and private key for limited publication. Therefore, terminal 4 cannot display or otherwise the predetermined element included in the data uploaded from terminal 1.

(Case Where Data in Node Is Updated)

Figure 9:
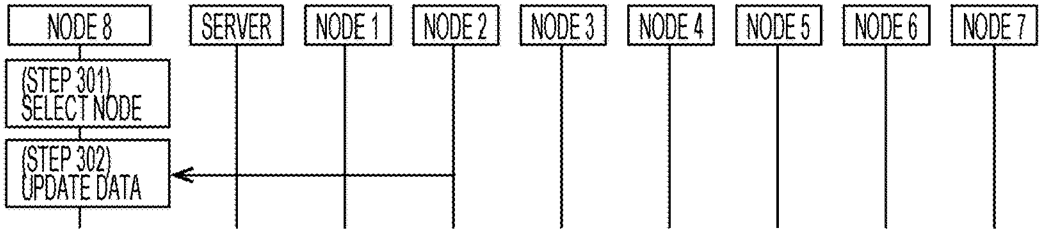
FIG. 9 is a diagram describing an operation example of a node according to the embodiment in a case where data in the node is updated.

FIG. 9 is a diagram describing an operation example of a node according to the embodiment in a case where data in the node is updated. The following steps are executed by the processor of the node. A program that causes the processor to execute these steps is recorded on the nonvolatile storage medium of the node. Data update is performed by, for example, copying data that is stored in another node but not stored in the own node from the other node and adding the copied data to the data of the own node. Data update is executed in parallel by each of the plurality of nodes. Hereinafter, as an example, a case where node 8 updates data in the own node by using the data in node 2 will be described. A description will be given below.

(Step 301)

First, node 8 executes a step of selecting one node. Here, it is assumed that node 2 is selected. This step is the same step as step 101 and step 201 described above. This step will be described in detail later.

Note that node 2 is selected in step 101 and node 8 is selected in step 201, which means that a different node is selected in each step. This is because of a difference in node identification information selected according to geographical proximity, a difference in node identification information selected at random, a difference in timings at which each step is executed (such as a case where a node that had stored correct data at a certain point in time stores incorrect data at another point in time due to falsification), or the like.

(Step 302)

Next, node 8 executes a step of updating the data stored in the own node by using data in node 2 selected in step 301. For example, in a case where data 1 is stored in node 8 and data 1 and data 2 are stored in node 2, node 8 copies data 2 from node 2 and adds data 2 to data 1 stored in the own node. After the update, data 1 and 2 are to be stored in node 8.

(Selection of Node)

Figure 10A:
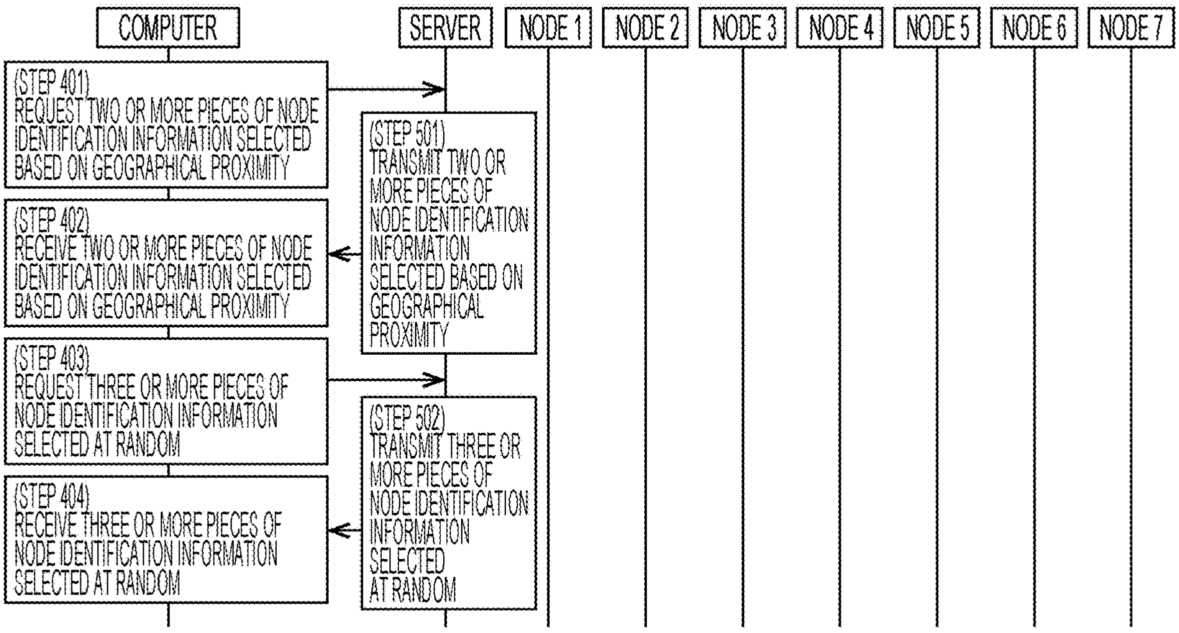
FIG. 10A is a diagram describing an operation example of a computer according to the embodiment in a case of executing a step of selecting one node.
Figure 10B:
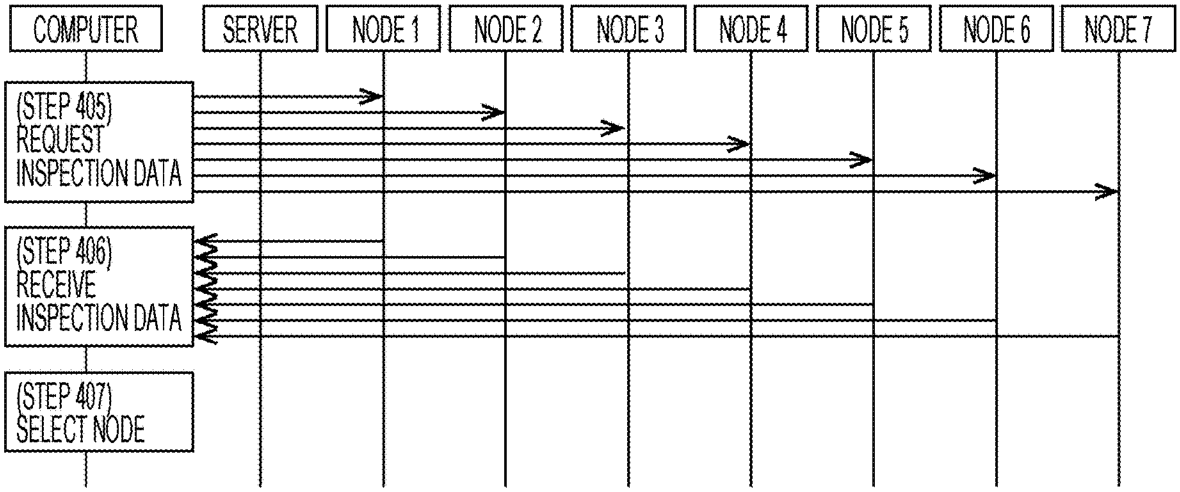
FIG. 10B is a diagram describing the operation example of a computer according to the embodiment in a case of executing a step of selecting one node.

FIGS. 10A and 10B are diagrams describing an operation example of a computer according to the embodiment in a case of executing a step of selecting one node. The following steps are included in the "step of selecting one node" described above in step 101, step 201, and step 301. The "step of selecting one node" is executed by executing the following steps. The following steps are executed by the processor of a terminal or a node. A program for causing the processor to execute these steps i recorded on the nonvolatile storage medium of the terminal or the node. Hereinafter, the term "computer" means a terminal in step 101 and step 201, and means a node in step 301. Hereinafter, a description will be given with reference to FIG. 10A and FIG. 10B.

(Step 401)

First, the computer executes a step of requesting two or more pieces of node identification information from the server. The two or more pieces of node identification information are selected based on geographical proximity from among a plurality of pieces of node identification information stored in the server.

(Step 402)

Next, the computer executes a step of receiving the two or more pieces of node identification information requested in step 401 from the server;

(Step 403)

Next, the computer executes a step of requesting three or more pieces of node identification information from the server. The three or more pieces of node identification information are selected at random from among the plurality of pieces of node identification information stored in the server.

It is preferable that the sum of the number of pieces of node identification information requested in this step and the number of pieces of node identification information requested in step 401 be an odd number so as to avoid a case where the number of nodes having the same inspection data is half of all the nodes. For example, in a case where an even number of pieces of node identification information are requested in step 401, it is preferable to request number of pieces of node identification information in step 403. On the other hand, in a case where an odd number of pieces of node identification information are requested in step 401, it is preferable to request an even number of pieces of node identification information in step 403. In the present embodiment, two pieces of node identification information are requested in step 401, five pieces of node identification information are requested in step 403, and a total of seven pieces of node identification information are requested in these two steps.

The sum of the number of pieces of node identification information requested in this step and the number of pieces of node identification information requested in step 401 is at least five or more. The sum is preferably seven more, more preferably nine or more, and still more preferably eleven or more so that a node storing correct data is highly likely to be selected. In the present embodiment, two pieces of node identification information are requested in step 401 and five pieces of node identification information are requested in step 403, that is, a total of seven pieces of node identification information are requested in these two steps. However, a total of five or more pieces of node identification information may be requested in these two steps. Preferably, a total of seven or more pieces of node identification information are requested (in the present embodiment). More preferably, a total of nine or more pieces of node identification information are requested. Still more preferably, a total of eleven or more pieces of node identification information are requested.

(Step 404)

Next, the computer executes a step of receiving the three or more pieces of node identification information requested in step 403 from the server.

(Step 405)

Next, the computer executes a step of requesting inspection data from each of the total of five or more nodes received from the server in steps 402 and 404.

Inspection data is data used to verify a node storing correct data. The inspection data is calculated by each node. All the nodes execute the same method to calculate detection data.

The node requested for verification data executes, for example, a step of adding the hash values of all the users stored in the own node, and a step of executing a hash function by using the value obtained through the addition as a parameter to calculate a hash value and transmitting the calculated hash value as inspection data to the computer. Referring to the data illustrated in FIG. 4, the node requested for verification data adds the hash value "123" in the first row, the hash value "234" in the second row, the hash value "345" in the third row, and the hash value "456" in the fourth row, executes a hash function by using the value "123234345456" obtained through the addition as a parameter to calculate a hash value, and regards the calculated value as inspection data.

Each node may calculate inspection data every time a request for inspection data is received. Each node may calculate and store the inspection data every time the node updates the data in the own node and may transmit the stored inspection data when receiving a request.

(Step 406)

Next, the computer executes a step of respectively receiving inspection data from the total of five or more nodes from which inspection data is requested in step 405.

(Step 407)

Next, the computer executes a step of determining whether a majority of the total of five or more nodes store a same inspection data and at least one of nodes identified by the two or more pieces of node identification information selected based on geographical proximity is included in the majority of the nodes storing the same inspection data, and when the at least one of nodes is included, selecting one node included in the majority of the nodes storing the same inspection data and identified by one of the pieces of node identification information selected based on geographical proximity.

For example, a case will be described where terminal 1 receives inspection data from each of a total of seven nodes consisting of nodes 1 and 2 geographically close to the computer and nodes 3 to 7 selected at random, and the pieces of inspection data received from a total of four nodes consisting of nodes 2, 3, 4, and 5 are the same. In this case, because the four nodes account for the majority of the total of seven nodes, in other words, because four is more than half of seven, node 2 that is geographically close to the computer is selected from among the total of four nodes including nodes 2, 3, 4, and 5 having the same inspection data.

If the computer determines in this step that the at least one of nodes is not included, the computer returns to step 401 described above and repeats the above-described steps until the computer determines in this step that the at least one of nodes is included, for example. The process may be stopped if it is determined in this step that the at least one of nodes is not included even after a predetermined time has elapsed, or if it is determined in this step that the at least one of nodes is not included even after the above steps are repeated a predetermined number of times. In the case of stopping the process, for example, an indication indicating that the process has been stopped can be output onto a screen or the like of the computer.

Operation Example of Server

Hereinafter, a program to be executed by the server according to the embodiment will be described with reference to FIG. 10A. The following steps are executed by the processor of the server. A program for causing the processor to execute these steps is recorded on the nonvolatile storage medium of the server.

(Step 501)

The server executes, in response to receiving a request for two or more pieces of node identification information selected based on geographical proximity from a computer such as a terminal or a node, a step of selecting two or more pieces of node identification information based on geographical proximity from among a plurality of pieces of node identification information stored in the server and transmitting the selected two or more pieces of node identification information to the computer.

Geographical proximity can be determined, for example, by executing the following step. For example, the determination can be made by executing a step of determining whether a computer and a node belong to the same area, such as Asia, North America, or Europe, and when the computer and the node belong to the same area, selecting the node as a node that is geographically closer to the computer than nodes belonging to other areas. Furthermore, a node located at a latitude and longitude close to a latitude and longitude of the computer can be determined to be a node that is geographically close to the computer. For these determinations, for example, the IP address of the computer and the IP address of the node can be used. In this case, the computer may transmit the IP address of the computer to the server together with the request of this step, for example. Alternatively, the server that has received the request of this step may transmit a transmission request for the IP address to the computer, and the computer that has received the transmission request may transmit the IP address of the computer to the server.

(Step 502)

The server executes, in response to receiving a request for three or more pieces of node identification information selected at random from a computer such as a terminal or a node, a step of selecting at random three or more pieces of node identification information from among the plurality of pieces of node identification information stored in the server and transmitting the selected three or more pieces of node identification information to the computer.

According to the present embodiment described above, when a majority of a total of five or more nodes store a same inspection data, in other words, when the number of nodes storing the same inspection data exceeds half of the total of five or more nodes, one node is selected from among the plurality of nodes storing the same inspection data. That is, when the number of nodes storing the same inspection data exceeds half of the total of five or more nodes, it is considered that the plurality of nodes storing the same inspection data store correct data, and one node is selected from among the plurality of nodes storing the same inspection data.

According to the present embodiment, it is not necessary to use a toke for selecting a node, and it is not necessary to incorporate a token into data. Thus, it is possible to reduce the possibility that data management is used for speculation aimed at acquiring a token and sound development of a service using the data management can be promoted. A reward given in the system using the present embodiment can be paid from an operator of a server, a network, or the like to a user who operates a terminal or to an administrator of a node in the name of a royalty or the like in accordance with how much contribution was made as the administrator of the node, a quality of data uploaded as the user, or the like or, in other words, how much contribution was made to the sound development of a service using the system according to the present embodiment instead of in the form of giving a token incorporated in data. The reward such as a royalty enables the user or the administrator of the node to correctly recognize the meaning or validity of contributing to sound development of a service or the like using the system according to the present embodiment. Thus, an action of contributing to sound development of a service or the like can be promoted. That is, an action of increasing the number of times of uploading high quality data highly evaluated by other users, an action of increasing the number of times of downloading data to increase the number of times of communication with other users, or an action of frequently taking measures to improve security to prevent data in the node managed by oneself from being falsified so that the number of times the node managed by oneself is selected as a node storing correct data increases, can be expected.

In addition, according to the present embodiment, processing such as uploading and downloading of data and updating of data are performed targeting a node located at a geographically close position. Therefore, the time required for these processes can be shortened.

As the above-described hash function, SHA-256 can be used, for example. However, the type of hash function is not particularly limited in the application of the present embodiment.

As the above-described encryption and decryption method, SHA-256 can be used, for example. However, the type of encryption and decryption method is not particularly limited in the application of the present embodiment.

The above-described terminals and nodes may be operated in sequence, but are preferably operated in parallel.

While the embodiment has been described above, the forgoing descriptions merely illustrate examples, and the configurations described in the claims are not limited by these descriptions. Even a mode different from the above description exhibits an effect of the present invention and is included in the present invention as long as the mode includes a configuration described in the claims.

The invention claimed is:

1. A system in which a plurality of terminals, a plurality of nodes that communicate with each other in a peer-to-peer manner, and a server that stores node identification information that identifies the plurality of nodes are connected to each other by a network, wherein each terminal is configured to execute, in a case of uploading data to one of the plurality of nodes:

selecting one node;

encrypting a predetermined element included in data to be uploaded; and uploading the data including the encrypted element to the selected one node, wherein each terminal is configured to execute, in a case of downloading data from one of the plurality of nodes:

selecting one node;

downloading data from the selected one node; and decrypting a predetermined element included in the downloaded data, wherein each node is configured to execute:

the selecting one node; and updating data stored in the own node by using data stored in the selected one node, and wherein the selecting one node includes:

requesting two or more pieces of node identification information from the server, the two or more pieces of node identification information being selected based on geographical proximity from among a plurality of pieces of node identification information stored in the server;

receiving the two or more pieces of node identification information from the server;

requesting three or more pieces of node identification information from the server, the three or more pieces of node identification information being selected at random from among the plurality of pieces of node identification information stored in the server;

receiving the three or more pieces of node identification information from the server;

requesting inspection data from each of a total of five or more nodes received from the server;

receiving the inspection data from each of the total of five or more nodes; and determining whether a majority of the total of five or more nodes store the same inspection data and at least one of nodes identified by the two or more pieces of node identification information selected based on geographical proximity is included in the majority of the nodes storing the same inspection data, and when the at least one of nodes is included, selecting one node included in the majority of the nodes storing the same inspection data and identified by one of the pieces of node identification information selected based on geographical proximity.

2. The system according to claim 1, wherein the encrypting a predetermined element included in data includes:

generating a master key by using a personal public key of a specific user and a personal private key of a user who operates the terminal;

generating a public key for limited publication and a private key for limited publication by using the generated master key;

encrypting the generated master key by using the personal public key of the specific user; and encrypting a predetermined element other than the encrypted master key in data including the encrypted master key as one element by using the generated public key for limited publication, and the decrypting a predetermined element included in the data includes:

decrypting the encrypted master key included in the downloaded data by using a personal private key of the specific user;

regenerating the public key for limited publication and the private key for limited publication by using the decrypted master key; and decrypting a predetermined element other than the encrypted master key included in the downloaded data by using the regenerated private key for limited publication.

3. A non-transitory computer-readable storage medium storing a program which, when executed on a terminal, causes the terminal to execute:

in a case of uploading data to a node, selecting one node;

encrypting a predetermined element included in data to be uploaded; and uploading the data including the encrypted predetermined element to the selected one node, and in a case of downloading data from a node, the selecting one node;

downloading data from the selected one node; and decrypting a predetermined element included in the downloaded data, wherein the selecting one node includes:

requesting two or more pieces of node identification information from the server, the two or more pieces of node identification information being selected based on geographical proximity from among a plurality of pieces of node identification information stored in the server;

receiving the two or more pieces of node identification information from the server;

requesting three or more pieces of node identification information from the server, the three or more pieces of node identification information being selected at random from among the plurality of pieces of node identification information stored in the server;

receiving the three or more pieces of node identification information from the server;

requesting inspection data from each of a total of five or more nodes received from the server;

receiving the inspection data from each of the total of five or more nodes; and determining whether a majority of the total of five or more nodes store the same inspection data and at least one of nodes identified by the two or more pieces of node identification information selected based on geographical proximity is included in the majority of the nodes storing the same inspection data, and when the at least one of nodes is included, selecting one node included in the majority of the nodes storing the same inspection data and identified by one of the pieces of node identification information selected based on geographical proximity.

4. The non-transitory computer-readable storage medium according to claim 3, wherein the encrypting a predetermined element included in data includes:

generating a master key by using a personal public key of the specific user and a personal private key of a user who operates the terminal;

generating a public key for limited publication and a private key for limited publication by using the generated master key;

encrypting the generated master key by using the personal public key of the specific user; and encrypting a predetermined element other than the encrypted master key in data including the encrypted master key as one element by using the generated public key for limited publication, and wherein the decrypting a predetermined element included in the data includes:

decrypting the encrypted master key included in the downloaded data by using a personal private key of the specific user;

regenerating the public key for limited publication and the private key for limited publication by using the decrypted master key; and decrypting a predetermined element other than the encrypted master key included in the downloaded data by using the regenerated private key for limited publication.

5. A non-transitory computer-readable storage medium storing a program which, when executed by a node, causes the node to execute:

selecting one node; and updating data stored in the own node by using data stored in the selected one node, wherein the selecting one node includes:

requesting two or more pieces of node identification information from the server, the two or more pieces of node identification information being selected based on geographical proximity from among a plurality of pieces of node identification information stored in the server;

receiving the two or more pieces of node identification information from the server;

requesting three or more pieces of node identification information from the server, the three or more pieces of node identification information being selected at random from among the plurality of pieces of node identification information stored in the server;

receiving the three or more pieces of node identification information from the server;

requesting inspection data from each of a total of five or more nodes received from the server;

receiving the inspection data from each of the total of five or more nodes; and determining whether a majority of the total of five or more nodes store the same inspection data and at least one of nodes identified by the two or more pieces of node identification information selected based on geographical proximity is included in the majority of the nodes storing the same inspection data, and when the at least one of nodes is included, selecting one node included in the majority of the nodes storing the same inspection data and identified by one of the pieces of node identification information selected based on geographical proximity.

6. A non-transitory computer-readable storage medium storing a program which, when executed on a computer, causes the computer to execute:

requesting two or more pieces of node identification information from a server, the two or more pieces of node identification information being selected based on geographical proximity from among a plurality of pieces of node identification information stored in the server;

receiving the two or more pieces of node identification information from the server;

requesting three or more pieces of node identification information from the server, the three or more pieces of node identification information being selected at random from among the plurality of pieces of node identification information stored in the server;

receiving the three or more pieces of node identification information from the server;

requesting inspection data from each of a total of five or more nodes received from the server;

receiving the inspection data from each of the total of five or more nodes; and determining whether a majority of the total of five or more nodes store the same inspection data and at least one of nodes identified by the two or more pieces of node identification information selected based on geographical proximity is included in the majority of the nodes storing the same inspection data, and when the at least one of nodes is included, selecting one node included in the majority of the nodes storing the same inspection data and identified by one of the pieces of node identification information selected based on geographical proximity.

* * * * *